United States Patent [19]
Rosar et al.

[11] Patent Number: 4,726,710
[45] Date of Patent: Feb. 23, 1988

[54] CO-DISPOSAL POLLUTION CONTROL METHOD

[75] Inventors: Edward C. Rosar, Lakewood; Maurice G. Pattengill, Golden, both of Colo.

[73] Assignee: Industrial Resources, Inc., Chicago, Ill.

[21] Appl. No.: 874,622

[22] Filed: Jun. 16, 1986

[51] Int. Cl.$^4$ .............................................. C04B 18/06
[52] U.S. Cl. ............................. 405/129; 106/DIG. 1; 210/751; 405/263
[58] Field of Search ............... 405/128, 129, 270, 263, 405/264, 265; 106/DIG. 1; 210/751

[56] References Cited

U.S. PATENT DOCUMENTS

| | | | |
|---|---|---|---|
| 3,859,799 | 1/1975 | Jaco | 405/128 |
| 3,876,537 | 4/1975 | Dulin et al. | 210/751 X |
| 3,962,080 | 6/1976 | Dulin et al. | 106/DIG. 1 |
| 3,984,312 | 10/1976 | Dulin et al. | 423/145 |
| 4,004,885 | 1/1977 | Groenendaal et al. | 55/479 |
| 4,145,396 | 3/1979 | Granthan | 423/155 |
| 4,279,873 | 7/1981 | Felsvang et al. | 423/242 |
| 4,353,803 | 10/1982 | Dover, Jr. | 210/728 |
| 4,395,975 | 8/1983 | Ashworth et al. | 48/77 |
| 4,439,062 | 3/1984 | Kingsbury | 405/54 |
| 4,473,477 | 9/1984 | Beall | 210/691 |
| 4,555,391 | 11/1986 | Cyran et al. | 423/242 |
| 4,588,569 | 5/1986 | Cyran et al. | 423/242 |

OTHER PUBLICATIONS

Toxic and Hazardous Waste Disposal, vol. 1, Processes for Stabilization/Solidification, edited by Robert B. Pojasek, Ann Arbor Science Publishers Inc., 1979, chapter 18, pp. 363-399.

Primary Examiner—David H. Corbin
Attorney, Agent, or Firm—Jacques M. Dulin

[57] ABSTRACT

Process for disposal of fossil fuel ash by addition thereto of sodium salts, preferably sodium sulfur oxide salt $Na_2SO_x$ where x is 3 and/or 4, in an amount ranging from 5-85 weight percent (dry basis) and adjusting the water percentage to within the range of 6-35%, preferably 15-28%. The coefficient of permeability of the ash and sodium salt is reduced from $10^2$ cm/sec to the "impermeable" standard of $10^{-6}$ and below. The preferred mixes also call for a smectite clay additive present in the range of from 0.1% to 5%. A flocculant in amounts of 0.01% to 1% can be substituted for about 3-5% of the water content. A principal source of the $Na_2SO_x$ is sodium FGD waste, preferably from the use of Nahcolite (a natural mineral form of sodium bicarbonate) as an $SO_x$ sorbent in the Nahcolite FGD process. The resulting co-disposal process simultaneously renders the highly soluble $Na_2SO_x$ ($10^2$ g/L) and ash impermeable, and suitable for geomorphologically stable landfill disposal by known techniques to heights in excess of 200'.

18 Claims, No Drawings

CO-DISPOSAL POLLUTION CONTROL METHOD

FIELD

This application relates to the disposal of solid ash wastes from combustion of coal and oil in industrial and power plant facilities, and more particularly to the disposal of fly ash and bottom ash from industrial boilers and power plant furnaces. It has been discovered that the use of sodium sulfate, alone or in a mixture with montmorillionite smectite clays and/or various flocculants as minor additives, seals the fly ash making it impermeable, within accepted industry standards, as determined by accelerated leakage tests.

BACKGROUND

In 1984 (the most recent year data is available), power production at U.S. utility plants resulted in about 80 million tons of solid waste of which an estimated 72-76 million tons was produced from coal and oil combustion. Of the latter, about 53 million tons was fly ash from coal combustion, 19 million tons was bottom ash, and 5 million tons was sludge from flue gas scrubbers.

About 75% of this utility solid waste is disposed in landfills or surface impoundments, with only 25% being used as construction or road building material. Utilities operate over 1,000 waste disposal facilities, at a cost of around $800 million per year. By the year 2000, the total of fly ash, bottom ash and FGD sludge wastes is expected to increase to about 125-150 million TPY. Further, because of the expected more stringent regulations for landfills and more extensive groundwater monitoring, the disposal costs are expected to double.

Examples of typical coal ash constituents are found in the *Coal Ash Disposal Manual*, 2d Ed., Final Report October 1981, CS2049 Research Project 1685-3 by GAI Consultants Inc. for the Electric Power Research Institute, Palo Alto, Calif., and in U.S. Pat. No. 3,962,080. These references report that inorganic compounds of Si, Al, Fe, Ti, Ca and Mg comprise over 90% of coal ash in the form of unburned mineral matter (rock). But the focus is on toxic trace amounts of heavy metals (such as B, Ba, Be, Pb, Co, Cu, Cd, Cr, Zn, Zr, Se, Sn, and As), naturally occurring radionuclides (principally $Ra^{226}$, $Ra^{228}/Th^{228}$, $Th^{230}$ and $Th^{232}$), and organics such as polycyclic aromatic hydrocarbons (PAH's) that are part of the residual (unburned) fuel carbon. The fly ash and bottom ash are essentially indistinguishable in these toxic components.

The present methods of disposal of such ash components in open ponds or landfills permit slurry water, rain or ground water to leach those toxic elements from them and allows the elements to migrate into the ground water. This is particularly the case where the leaching water contains natural, or ordinarily present, chemicals (e.g. acid rain, or acid or caustic sludges) which tend to accelerate leaching. In view of the hazards involved with such toxic trace elements or PAH's entering the groundwater, the utility industry is researching the leachability of ash and sludge wastes. That industry is also vitally interested in methods of inhibiting leach water migration, such as by the use of pond and landfill bottom and top liners.

Still another concern in the utility industry involves desulfurization of flue gas using reactive sorbents to remove sulfur oxide compounds from the flue gases to meet EPA emission standards. For example, 60-70% of the sulfur in low sulfur Montana coal (containing about 0.5% total S) must be removed to achieve compliance. There is also impetus for better FGD processes. This impetus is derived from the growing concern over acid rain problems traceable to stack gas $SO_x$ emissions. Currently, the principal FGD process involves wet limestone scrubbing which results in approximately 5 million TPY of disposable calcium sulfate scrubber sludge. Less than 1% of this sludge is utilized in any meaningful fashion (typically for gypsum-type wallboard). This wet sludge is usually disposed of in ponds, but for dam safety reasons the disposal ponds are rarely more than 20 feet (6 meters) deep. In contrast, dry landfill materials can be compacted to a denser product and can be stacked over 100 feet (30 meters) in height. Because of poor structural properties, the calcium sulfate sludge must be dewatered and stabilized before it is deposited in a landfill.

Further, there is increased interest in the use of sodium compounds instead of calcium as the FGD sorbent because of: (1) the higher reactivity of sodium compounds; (2) the lower capital investment; and (3) the greater ease of retrofiting sodium FGD equipment to existing plants. This is particularly true in the case of dry FGD processes involving the use of Nahcolite, a naturally occurring sodium bicarbonate mineral, which is introduced in a dry powdered form into the flue gas of a power plant. The Nahcolite reacts with the $SO_x$ in the flue duct and is collected in a baghouse or electrostatic precipitator. Nahcolite can remove from 70% to well over 90% of the $SO_x$ at stoichiometry, depending upon the flue gas temperature. The Nahcolite process has the advantage of producing a dry waste product. In contrast, wet scrubber sludges, being difficult and expensive to dewater, must be disposed of in ponds, or if landfill disposal is desired, must be chemically processed to provide the stability required for the landfill because of their poor structural integrity.

There is some concern over the relative solubility of sodium FGD wastes, which are predominately sodium sulfate. One solution is shown in U.S. Pat. No. 3,962,080, which is directed to the SINTERNA process involving sintering a conglomerate of FGD waste plus fly ash. The resultant sintered pellets have lower solubility than calcium sulfate scrubber sludges; they also have a variety of commercial uses or may be disposed in simple landfills. Another solution to sodium solubility is shown in U.S. Pat. No. 3,984,312 directed to the FERSONA process in which the sodium FGD waste is reacted in solution with ferric ions and sulfuric acid to produce an insoluble basic hydrous or anhydrous sodium hydroxy ferric sulfate or sulfite compound. These compounds are insoluble compared to scrubber sludge calcium sulfate. Both these processes involve additional thermal or chemical processing prior to disposal.

Another approach to the disposal of the sodium FGD waste is isolation clay landfill. In *The Use of Nahcolite Ore and Bag Filters For Sulfur Dioxide Emission Control*, ACPA Journal, Vol. 25, No. 12, December 1975, pp 1244-1253, at 1252, there is shown a process for disposal of sodium FGD waste in special landfills. An impermeable base of material is required over which is emplaced a day's production of FGD waste from the power plant. That waste is then covered with a layer of clay on the order of 1 foot thick, forming an isolated clay cell. Each day's production is thus sealed in a clay envelope, generally romboidal in cross section. Each succeeding day's production rests in part on the cover and side layers of the preceding day's production. The final cover for the top is a 3 foot thickness of clay-like material, and the sides require a 4 foot layer. While this approach may be environmentally approvable in certain situations, there is concern over the potential for breaching the integrity of the overlying or underlying clay envelope walls, followed by subsequent leaching of the soluble sodium sulfate therefrom by rain water. In addition, there is some fugitive dust problem during the emplacement of the very dry FGD waste. There is also concern over the potential for cracking-open of the envelope(s) if a portion becomes wet and the sodium sulfate expands as it hydrates. This expansion could cause heaving and cracking, thus breaching the integrity of the landfill.

Reginato, et al. in *Sodium Carbonate for Reducing Seepage from Ponds*, U.S. Water Conservation Laboratory, WCL Report 7, Jan. 1, 1968, 7 pages, recommend treating stock ponds having large quantities of calcium in the water and soil with tech grade granular soda ash to reduce seepage. The soda ash is worked into the bottom and sidewalls of the dry point to a depth of 4 inches by disking or harrowing. After receiving water, soda ash is added to the water in an amount not exceeding 0.88 lbs/1000 gallons of water (so cattle can still drink the water). Additional sodium is supplied by adding NaCl to the water. This procedure reduces the pond seepage from 5 inches/day to 0.1 inch/day, a 50-fold reduction in seepage.

While produced in relatively small quantities today, the amount of FGD waste generated will be increasing rapidly as FGD processes become adopted by industry and utilities. Thus, the utility waste problem will be increasing, not only by the changes in regulation requirements and enforcement, but also by the addition of FGD wastes to be disposed in addition to the fly ash and bottom ash.

Accordingly there is a great need in the industry to provide an improved process for disposing of fly ash alone or in combination with a dry FGD waste, particularly the sodium FGD wastes.

THE INVENTION

Objects

It is among the objects of this invention to provide an improved method of preparing waste fossil fuel ash for landfill disposal which results in the stabilization of the ash for long term disposal.

It is another object of the invention to provide a method for co-disposal of both fossil fuel ash and dry sodium FGD sorbent wastes.

It is another object of this invention to provide a method of co-disposal of fly and/or bottom ash by the introduction of a sodium salt compound, preferably a sodium sulfur oxide salt, and a minor portion of smectite clay and/or flocculant.

It is another object of this invention to provide a co-disposal method of insolubilizing waste fossil fuel ash and sodium FGD wastes so that they may be safely disposed in standard landfills by known techniques.

It is another object of this invention to provide a method for disposal of spent nacolite FGD sorbent by stabilizing the waste in a co-disposal process which also simultaneously disposes of fly ash and/or bottom ash from the industrial or utility plant which produces the ash.

It is another object of the invention to geomorphologically stabilize ash and EGD sodium sorbent wastes, limit their hydraulic permeability to below about $10^{-6}$ cm/sec, and reduce dusting problems.

Still other objects will be evident from the summary, detailed description and the claims which follow.

Summary

The invention comprises a method of preparing waste fossil fuel ash for disposal which comprises the steps of providing a waste fossil fuel ash such as fly ash and/or bottom ash, introducing a sodium salt compound, preferably a sodium sulfur oxide salt, into the ash in the range of from about 5 to 85 weight percent on a dry basis to form an ash/sodium oxide salt composite. This composite is then mixed with a smectite clay additive in an amount in the range of from about 0.1% to about 5% and/or a flocclant additive in an amount in the range of from about 0.01% to 1.0%, on a dry weight basis, in the presence of sufficient water to produce an additive-enhanced wetted composite, having about 6 to 35% by weight water content, suitable for disposal. The flocculant is a substitute for up to about 3–5 of the percentage points of said water percentage.

While finely divided sodium sulfate and most ashes by themselves are highly permeable, surprisingly, the use of the highly water soluble sodium sulfur oxide salts, (solubility on the order of $1-4 \times 10^2$ g/L) renders the composite mix prepared in accord with the invention impermeable, even when used in large quantities (55% or more of the total mix), and even when 18–20% water content is present.

Water movement through soil is called percolation and the measure of it is the permeability. The coefficient of permeability, k, represents the discharge through a unit area at unit hydraulic gradient. Thus, 1 cubic foot per square foot per year at unit gradient is virtually equal to $10^{-6}$ cm/sec. As noted in *Design of Small Dams*, 2d Ed. 1973, Revised Reprint 1974, U.S. Dept. Interior, Bureau of Reclamation, Water Resources Technical Publication, p. 138, it is customary to describe soils with permeabilities less than 1 foot ($10^{-6}$ cm/sec) per year as impervious; those with permeabilities between 1 and 100 ft/year as semi-pervious; and soils with permeabilities greater than 100 ft/year as pervious. "Impermeability" or "impermeable" as used herein is thus the generally accepted standard of below about $10^{-6}$ cm/sec, and preferably below about $10^{-7}$ cm/sec, percolation through the composite, compacted to densities near 100% of maximum density as determined by ASTM D698 in accord with the invention. Even where $10^{-6}$ cm/sec might be considered somewhat borderline, values of $5 \times 10^{-6}$ cm/sec indicates a good mix from the point of view of permeability and may be site-specifically acceptable. Values of $10^{-7}$ cm/sec and below are considered fully impermeable. The composites of this invention show permeabilities on the order of about $5 \times 10^{-6}$ cm/sec or below, as a result of which they are classified as impermeable.

It is preferred to permit the wetted composite to swell for a period of time sufficient that swelling substantially ceases before the additive-enhanced composite is disposed in a compacted landfill. The swell time may range on the order of ½ to 8 hours. Typically, the greatest portion of the swelling occurs within the first few hours. The amount of water required depends on the amount of water originally present in the mix components plus additional water needed to achieve the optimum moisture level.

In operation, a surprisingly accurate approximation of the optimum water required may be achieved by using an amount of water sufficient to produce a composite of dough-like texture. This amount also typically produces a composite of maximum density. Thus, the texture and/or density may be used as measures in field operations. Assaying shows that the preferred amount of water is usually in the range from about 15 to 28% by weight, but may range as high as 35%.

The composite is considered "set" when a minimum value of penetration resistance of 4.5 Tons/sq.ft. (as measured by pocket penetrometer) is reached. For each particular mix, the lower the moisture content, the shorter the time to set. For moisture contents in excess of optimum, the set times are lengthened (retarded), and for moisture contents lower than optimum, the set times are accelerated. For example, in one test mix as the moisture content increased, the set time was lengthened, from less than 1 hour for 10% moisture to in excess of 15 hours for 20% moisture.

Heating the mix tends to have minimal effect on setting. For example, in one test series using a mix of 59% Ohio Fly Ash, 39.4% sodium sulfate, 1.6% Volclay (dry weight basis), setting times at ambient temperature for 19.3% and 23% moisture were 9 and 10 minutes respectively. When heated to 100° F. the figures were 4.5 and 14 minutes respectively, and at 150° F. the figures were 9 and 15 minutes respectively.

In most cases low moisture composites tend to be permeable (in some cases highly permeable), often exhibit lower than optimum density, and often do not compact as well.

We prefer the sodium oxide salt to be a result of using Nahcolite as a dry sodium sorbent in a FGD process. The Nahcolite is provided in a finely divided condition and injected into the flue gas downstream from the superheater tubes of the boiler. The residence time of the Nahcolite is adjusted to provide the desired percentage of $SO_x$ removal and is collected in a baghouse or electrostatic precipitator. The spent Nahcolite FGD waste is thus a mixture of fly ash and $Na_2SO_x$ wherein x is 3 or 4. There may also be residual amounts of unreacted Nahcolite (sodium bicarbonate), or calcined Nahcolite, (which would be sodium carbonate, $Na_2CO_3$). These residuals are present in relatively small percentages as compared to the sodium sulfate/sulfite in the FGD waste. The process of this invention, in disposing of both ash and FGD waste, is a pollutant co-disposal method.

In some plants, the bottom ash may comprise up to about 80% by weight of the entire ash mixture, with the balance being fly ash. In relatively high ash Western coals, the sulfur content is typically low, usually below 0.6%, while the ash content may run as high as 16%. In other coals, the sulfur content may be greater and the fly ash portion of the plant's entire ash production can predominate. Further, it is preferred to employ the bottom ash in relatively small size particles, typically on the order of 60% by weight less than 10 U.S. Standard Series mesh.

As set forth below in the Detailed Description, samples of the composites of this invention were subjected to accelerated permeability tests. A 6" layer of each composite mixture was packed to densities near 100% of maximum densities as determined by ASTM D698 procedures in a 4" dia column over which was placed 1 foot of water. The column was pressurized to provide a simulated 10 foot water head. The test cells which did not show a breakthrough of water prior to 2 days, would all exhibit a permeability below the $10^{-7}$ "impermeability" standard. In some instances, the composite mixes showed long term no-leak histories (no breakthrough) after periods in excess of 120 days.

While we do not wish to be bound by theory, we believe that the presence of the sodium sulfate in the composite serves a vital function. The water serves in part to hydrate the anhydrous sodium sulfate and/or sulfite, thus creating an approximate 70-80% volumetric expansion of the affected sulfate and/or sulfite due to recrystallization, and to release sufficient sodium ions to either maintain, or by cation exchange, replace the cations in the exchangeable positions in the smectite clay crystal structure, thus maintaining or producing a high swell potential, thixotropic clay material.

For example, if a calcium-rich montmorillonite is changed to a sodium-rich montmorillonite by cation exchange, its swell potential could increase by up to 50% in some cases. Although the smectite in the mixes exhibits some swelling properties, its most important function is due to its thixotropic characteristic in performing as a lubricant to allow uniform intermixing of the sodium salts and the fly ash components, and as an agent to bind the sodium salts to the fly ash particles.

Upon initial mixing, the composites exhibited swelling in relation to the quantity of sodium salts. As sodium salt content increased to the 40-50% range, the swelling increased to 15-20% (i.e. a volume of 115-120% of original mix). Above that sodium salt content level the percent swell tended to decrease. Upon setting (relaxing), the amount of swell determined for the set (relaxed) mixes was lower than the amount of swell determined for the samples immediately after mixing, if the swells determined immediately after mixing exceeded 1.8%; that is, the swells determined for relaxed samples were lower than the swells determined for samples tested immediately after mixing. For mixes of predominantly fly ash and 35-45% sodium salts, the initial swell immediately after mixing was in the 10-20% range. Upon setting (relaxation) for 3-5 hours after mixing, the resultant total (final) swell approached zero. The combination of the volumetric expansion due to hydration of the sulfate and/or sulfite and clay bonding following by setting (relaxation) forms an impermeable composite which effectively retards water migration to a rate below the impermeability threshold.

The process of this invention is relatively simple for field operations. The water requirement may be added at any convenient stage, either directly to the clay, to the ash or to the FGD waste. In some instances, the bottom ash may have substantial water content sufficient for the composite formation. In other instances, the clay itself may be sufficiently wet. In still other instances, water sufficient to bring a particular mix to the optimum dough-like texture and density may be added, for example, by spraying the water into the composite while it is being mixed. We prefer to premix the required water with the smectite clay to form a slurry, then mix the slurry with the ash/sodium salts mixture. It is also preferred to keep the sodium sulfate component dry until the mixing so that the hydrate formation occurs in conjunction with the interlayer transfer of sodium ions into the clay matrix; but this slurry formation is not absolutely necessary.

The requisite swelling of the composite may occur in various ways: for example, in a special holding pile for later emplacement in a landfill, during transport to the landfill, or after emplacement in the landfill but before being finally compacted and overlaid with a clay surface or interlayer. After mixing and swelling, the composite mix is emplaced in a landfill and compacted. The emplacement equipment (front end loaders, graders, dump trucks) running over the surface should suffice for the requisite tamping force. The emplaced composite of this invention is geomorphologically stable so that well in excess of 100–200' high landfills are feasible. The disposed material must be kept below 90° F. to prevent hydrous sulfate breakdown.

Where the landfill requires a bottom liner, an appropriate clay, a natural rubber, or a synthetic plastic liner, such as a Hypalon plastic sheet may be employed. In this regard, the high sodium content provided by the sodium sulfur oxide component of the composite performs a vital function. Where the pond liner is formed from a sodium-base swelling clay, it is subject to cation exchange in the exchangeable interlayer positions if a cation-rich source is present. The high calcium content of the fly ash could provide sufficient calcium ion to displace the sodium ions in the clay interstructure, thus converting the clay to a variety having less swell potential. This could lead to clay shrinkage and crack formation which could permit breaching of the liner. In the process of this invention, the presence of the sodium oxide salt compound will provide a sufficient excess of sodium ions to prevent the ion exchange and corresponding shrinkage of the liner clay, thus maintaining the integrity of clay bottom liner.

It should be understood however, that ordinarily no liner is required for the disposed ash and/or sodium FGD wastes in accord with this invention.

X-ray diffraction studies of a typical composite test sample shows that in the first 3 days, the sodium sulfate is in the Thenardite form which is anhydrous sodium sulfate, $Na_2SO_4$. By the fourth day, it has been hydrated to the Mirabilite form, the decahydrate $Na_2SO_4 \cdot 10H_2O$. This is for a typical composite comprising 55% fly ash, 45% sulfate, 1% smectite clay, and 18.5% water. To speed the decahydrate formation, the composite may be seeded with a minor amount of decahydrate crystals, on the order of one pound per one hundred tons, as the seed crystals accelerate the hydrate formation process. In addition to seed crystals, decahydrate formation can be accelerated by temperatures below about 77° F., providing adequate water is available.

The three types of coal burning furnaces produce different ratios of fly ash to bottom ash. For the pulverized coal dry ash furnace, the ratio is on the order of 80 to 20, fly ash to bottom ash. A pulverized coal furnace with a slag tap produces an approximately 50/50 mix, while a cyclone furnace produces approximately 20–30% fly ash and 70–80% bottom ash. While the chemical compositions of the ashes are very similar, the size and form of the particles may vary. The fly ash is generally extremely fine, on the order of 90% less than 200 mesh (74 microns) while the bottom ash is coarser, depending upon the furnace type. Preferably it is ground to approximately 60% passing 10 mesh into the composite for best impermeability results. While unground bottom ash may be used, the fixing of soluble components tends to be less uniform because the resulting composite is less homogenous.

The minimum amount of sodium sulfur oxide compound introduceable into the composite needed for the fixing of the ash components is on the order of 5%, with the most preferred minimum being on the order of 9–11%. Generally, the coarser the mix, that is, the larger the average particle size is, the more sodium sulfate is necessary to fix the ash.

The sealant composites of this invention involving the mixtures of combustion ashes, sodium compounds and clay impedes the ingress of water into the landfill and retards the solution and removal of soluble species from the disposal site. The invention thus results in limiting, to a practical extent, the loss of soluble species from a disposal site.

As the percentage of sodium sulfate decreases in the range below 45–55% of the total composite mix, the amount of smectite clay should be increased from 0.1% for about 55% sodium sulfate, to 5% for the range of about 5–11% sodium sulfate, as decreasing sodium salt content is accompanied by increasing ash content, and more smectite is necessary to maintain the lubrication needed for compacting, thorough blending and for bonding of the particles. Where the sodium sulfate content is greater than about 15–20% in the total composite mix, the grain size of the sodium sulfate is not important. However, when the sodium sulfate content is low, around 5–10%, the sodium sulfate should be fine-grained. The sodium sulfate produced by the use of solution-mined Nahcolite as the sodium sorbent in a dry FGD process is of sufficiently small grain size to provide the appropriate fineness required. When the sodium sulfate content is high, on the order of 75%, the heat of hydration of the sodium sulfate with water is noticeably lower when small amounts, on the order of 0.01 to 1% of flocculant are used.

DETAILED DESCRIPTION OF THE BEST MODE OF THE INVENTION

The following description illustrates the invention by way of example and not by way of limitation of the principles of the invention. This description will clearly enable one skilled in this art to make and use the invention, and describes many embodiments, adaptations, variations and uses of the invention, including what we presently believe is the best mode of carrying out the invention.

I. Materials

All materials were maintained in sealed containers to retard hydration, dehydration and/or contamination.

A. Smectite Clay Sources

A variety of swelling clay sources were used in the test program to simulate a variety of different field locations. These clay sources included soils containing various percentages of Ca, Mg or Na-rich Montmorillonite and one non-soil source, Volclay, a commercially available Na-rich Montmorillionite (bentonite). This product was a greenish-grey powder. Four soils, two from IL (LFS and ILL-C, which were essentially identical) one from KS, and one from CO were used as being potentially locally available sources of smectite clay. The soil samples were pulverized to $-\frac{1}{4}$ inch and blended. If the soils were too wet to pulverize, they were chopped into approximately $-1$ inch lumps then blended by hand and grab sampled for individual test use. The soil samples were not oven dried to best simulate field operation moisture content, and to maintain in-place, unaltered clay properties.

The following is a summary of pertinent test data for selected soils:

| KANSAS SOIL (KAN) | |
|---|---|
| Weight % minus two microns | = 18% (Total sample basis) |
| % Mg-rich Montmorillonite | = 16.2% (Total sample basis) |
| Cation Exchange Capacity (CEC) | = 32.8 meq/100 g. (dry wt basis) |
| Exchangeable Sodium (ES) | = 1.09 meq/100 g. (dry wt basis) |
| ILLINOIS SOIL (LFS or ILL-C) | |
| % Clay Minerals | = 10% (Total Sample Basis) |
| % Ca-rich Montmorillonite | = 2% (Total Sample Basis) |
| Cation Exchange Capacity (CEC) | = 18.0 meq/100 g (dry wt basis) |
| Exchangeable Sodium (ES) | = 0.164 meq/100 g. (dry wt basis) |
| DENVER CLAY SHALE (DCS) | |
| Wt % minus 2 micron | = 24% (Total sample basis) |
| % Ca-rich Montmorillonite | = 22% (Total sample basis) |
| Cation Exchange Capacity (CEC) | = 26.64 meq/100 g (dry wt) |
| Exchangeable Sodium (ES) | = 0.30 meq/100 (dry wt) |
| Maximum Dry Density | = 107.0 lb/cu. ft. |
| Optimum Moisture Content | = 18.5% |
| Liquid Limit | = 42 |
| Plastic Limit | = 19 |
| Plastic Index | = 23 |

Analyses of the major water soluble components in the Denver Clay Shale was:

| DENVER CLAY SHALE SOLUBLES | |
|---|---|
| Major Components | ppm |
| Ca | 76.3 |
| Mg | 15.2 |
| Na | 63.9 |
| K | 30.8 |
| Si | 57.3 |
| $SO_4$ | 63.3 |
| Cl | 52.0 |
| Total Solubles | 376.5 |

As received, the Kansas Soil was a dark brown damp soil having 76.1 weight % solids and containing about 16% Mg-rich montmorillionite; it was used as received. The Illinois soils were buff-brown or tan brown soil ranging in size from dust to 6" lumps which were crushed and blended before use. The Denver Clay Shale was a greyish-green soil ranging in size from dust to 6" lumps which were air dried, crushed and blended before use.

Selected moist bulk densities are as follows:

| | Moist Bulk Densities | | |
|---|---|---|---|
| | | lb/cu. ft. | |
| Material | % $H_2O$ | Uncompacted | Compacted |
| Denver Clay Shale (DCS) | 18.5 | 42 | 127 |
| Ill Soil (LFS or ILL-C) | 18.5 | 50 | 144 |
| Kansas Soil (KAN) | 18.5 | 125 | 144 |
| Colo FGD Waste (FGD) | 18.5 | 81 | 125 |
| Ohio Fly Ash No 1 (OFA-1) | 18.5 | 44 | 109 |

The values were determined by compaction of the moist soil (18.5 wt % moisture) into a stainless steel ring at 500 pounds pressure.

B. Ash and FGD Waste

Seven fly ash samples from three different sources were used in the test composites, 3 Ohio Fly Ashes, 2 Kentucky Fly Ashes, and 2 Colorado Fly Ashes. In addition, we used FGD waste formed by the injection of dry powdered Nahcolite injected in the flue gas of a Colorado power plant and collected in a baghouse along with fly ash in a dry condition. This was used as an example of a co-disposal waste as it contains both ash and sodium sulfate. This FGD waste, also called "spent Nahcolite", was a blended mixture of 12 different FGD pipe samples taken at various times during the Nahcolite process baghouse operational cycle over a 7-day period to insure a representative "average" sample of the waste.

The Ash and FGD waste characterization data is as follows:

TABLE I

| ASH AND FGD WASTE CHARACTERISTICS | | | | |
|---|---|---|---|---|
| Sample | Description* | Average Particle Size (microns) | % Organic Carbon | Wt % Solids |
| CO FGD Waste | Lt Grey-Brown | 2.3 | $ND^a$ | 98.5 |
| OH FA-No. 1 | Dark Grey | 5.9 | 1.28 | 100.0 |
| OH FA-No. 2 | Dark Grey-Black | 6.6 | 5.15 | 100.0 |
| OH FA-No. 3 | Dark Grey | 3.4 | 4.22 | 100.0 |
| KY FA Unit 1 | Dark Grey-Black | 9.3 | 2.25 | 99.7 |
| KY FA-Unit 2 | Dark Buff-Grey | 14.4 | 2.78 | 100.0 |
| CO FA-No. 1 | Light Grey-Buff | 5.6 | 1.14 | 100.0 |
| CO FA-No. 2 | Light Grey-Buff | 2.4 | $ND^a$ | 100.0 |

*All were powders
$^a$ND = Not Determined
FA = Fly Ash

Overall the data show wide variations in average particle size between different fly ash samples and between fly ash samples having the same origin. Regarding the organic carbon data, wide variation was noted between the Ohio Fly Ash samples (1.28–5.15%), but little variation was present between the two Kentucky Fly Ash samples (2.25–2.78%). No definite trending could be noted between the average particle size and the organic carbon content for the listed fly ash samples. All of the ash materials were individually blended before use.

The measured densities of the three Ohio Fly Ash samples, as received, ranged from 67–83 lb/cu.ft uncompacted and 74–92 lb/cu.ft. compacted. The uncompacted and compacted bulk densities of the two Kentucky Fly Ash materials were 62–66 lb/cu.ft. and 72–73 lb/cu.ft., respectively. The two Colorado Fly Ash samples were 45–52 lb/cu.ft. uncompacted and 54–60 lbs/cu.ft. compacted.

Following are data regarding the water soluble components in selected ash and FGD waste samples.

TABLE II

| WATER SOLUBLE COMPONENTS- FLY ASH AND FGD WASTE | | | |
|---|---|---|---|
| Sample | Major Components (ppm) | % Of Total | Total Water Solubles (ppm) |
| CO FGD Waste | Na-91,649 | 73.1 | 125,465 |
| | $SO_4$-31,687 | 25.3 | |
| | Cl-1,500 | 1.2 | |
| | Nitrite-268 | 0.2 | |
| OH FA-No. 1 | $SO_4$-3,357 | 67.8 | 4,948 |
| | Ca-1,221 | 24.7 | |
| | B-89.2 | 1.8 | |
| OH FA-No. 2 | $SO_4$-6946 | 78.5 | 8,843 |

TABLE II-continued
WATER SOLUBLE COMPONENTS-FLY ASH AND FGD WASTE

| Sample | Major Components (ppm) | % Of Total | Total Water Solubles (ppm) |
|---|---|---|---|
| | Ca-1,246 | 14.1 | |
| | Na-323 | 3.7 | |
| | K-233 | 2.6 | |
| OH FA-No. 3 | $SO_4$-7,936 | 98.3 | 8,073 |
| KY FA-Unit 1 | Ca-12,016 | 50.9 | 23,591 |
| | Na-5,047 | 21.4 | |
| | K-3,148 | 13.3 | |
| | $SO_4$-2,374 | 10.1 | |
| | Al-523 | 2.2 | |
| | Si-329 | 1.4 | |
| KY FA-Unit 2 | Na-4,786 | 50.2 | 9,531 |
| | Ca-2,510 | 26.3 | |
| | $SO_4$-989 | 10.4 | |
| | K-922 | 9.7 | |
| CO FA-No. 1 | Ca-9,458 | 45.6 | 20,762 |
| | Na-6,443 | 31.0 | |
| | Al-2,305 | 11.1 | |
| | $SO_4$-2,096 | 10.1 | |
| | K-260 | 1.2 | |
| | B-90.5 | 0.4 | |

These data show that the Colorado FGD Waste had the highest water soluble content (125,465 ppm). This is expected as the FGD process involved employs a sodium sorbent resulting in $Na_2SO_4$ as the predominant waste in the fly ash/spent sorbent mix. This was followed by the Kentucky Fly Ash-Unit 1, then the CO Fly Ash No. 1. The No. 2 and No. 3 Ohio Fly Ashes had similar water soluble contents while the No. 1 Ohio Fly Ash had the lowest water solubles content. The water soluble contents of the Kentucky Fly Ash Numbers 1 and 2 varied widely.

C. Sodium Salts

The FGD waste containing sodium salts (predominately $Na_2SO_4$, but also containing some $Na_2SO_3$, $NaHCO_3$ and $Na_2CO_3$) was described above. Other sodium salts which were used in the composite formulations are $Na_2SO_3$, $NaHCO_3$, $Na_2SO_4$, and Na sulfite/sulfate/carbonate mixtures (one high in Sulfate, two high in Sulfite). All samples were white powders and were used as received after blending. The Na sulfate/sulfite/carbonate mixture was a blended sample produced by reaction of $SO_2$ with a fluid bed of sodium bicarbonate (solution-mined Nahcolite from Industrial Resources, Inc., Lakewood, CO), and it assayed approximately 50.1% $Na_2SO_4$ and 20.72% $Na_2SO_3$. Two samples high in sodium sulfite were prepared in the same way and had essentially similar assays: pH 10.10–10.65; $Na_2SO_3$ 32.7–41.0%, with the balance split between $Na_2SO_4$ (52.7–48.5%) and $Na_2CO_3$ (14.6–10.5%). The sodium sulfate was a commercial product of —325 mesh used as $Na_2SO_4$ without analysis.

D. Flocculants

Flocculants were used in place of, or in addition to, the clay sources in the composite mixtures and were used as received. These materials were as follows:

| Flocculant | | Description |
|---|---|---|
| Percol 351 | White Powder | Nonionic dry powder, 100% active solids. |
| Calgon Catfloc "C" (CAT-C) | Reddish Brown Viscous Liquid | Cationic, 2000–4000 cps viscosity at 25° C., molecular weight 250–500,000. |
| Calgon Catfloc "LV" (CAT-LV) | Yellow Viscous Liquid | Cationic, 35 cps viscosity at 25° C., molecular weight 250–500,000. |
| Chem-Link CP-40 (CHEM) | Brown Liquid | Inorganic solution of 50% Ferric sulfate, 50% solids. |
| Chem-Link 5P-60 (CHEM) | Clear Viscous Liquid | Cationic at <8.0 pH, 2000–3500 cps viscosity at 25° C., molecular weight 20,000,000. 1.6% active solids. |

The Percol 351 is available from Allied Colloids, and the Chem-Link flocculants are available from Chem-Link, Division, Arco Chemical, Newton Square, Pa. The Chem-Link flocculants were mixed 2:1 CP-40:5P60 prior to use. The Calgon Catfloc C and LV flocculants are available from Calgon Corporation. The Catfloc C contained 40% solids, while the LV contained 20% solids. In all cases, flocculants were used in the composite mixtures in amounts less than 0.1 weight % (dry weight basis); they were mixed with the water required to achieve the desired moisture content. In addition to the above flocculants, Superfloc 127 or SF-363 from American Cyanamid, Wayne, NJ can be used.

II. Preparation of Composite Mixes

All mixes forming the composites of this invention were prepared at room temperature (around 70° F.) as follows: First, moisture contents were determined (where applicable). Then, blended portions of the materials used were obtained and size reduced to —10 mesh where necessary. In mixes where it was required that certain components be premixed with water, the components were mixed with a minimum amount of water to form a slurry in either a Waring-type or a Hobart-type blender until thorough blending was achieved. These premixed slurries were then blended into the other dry components using a laboratory scale mortar mixer unit. Mixing typically took 30 seconds in the Waring-type blender, and 1–3 minutes in the Hobart-type blender.

Water was then added in small increments to the materials until a consistency was reached that allowed the mass to agglomerate in the mixer into a single coherent dough-like ball that did not stick to the sides of the mixer container. This was the composite of the invention.

This composite mixture was removed from the mixer container and formed into a mass approximately 8" in diameter by 1½" thick. This mass was separated into 4 approximately equal portions; each portion representing one lift to be compacted into the test columns.

When premixing was not required, the same procedure was followed less the mixing in the Waring or Hobart blender. In all mixing procedures, deionized water was used.

Prior to any mixing, the weight percents of the components used, including an estimated amount of water, were calculated (based upon dry weight basis amounts of materials and water). After mixing, the component weight percents were recalculated based upon the actual amount of water used. The composites tested for impermeability characteristics are set forth below.

II A. Moisture Addition Level

To determine moisture addition levels required, moisture addition studies were performed on the Colorado FGD Waste/Ash and the Ohio Fly Ash No. 1 samples.

The samples were mixed with various amounts of water in a Hobart-type blender and observations made. The tests were continued until a mass was formed that had end points of (1) dry enough to handle without sticking to the mixing vessel, and (2) plastic enough to pack properly into the test columns. In Table III below, Tests 1-6 are on the CO FGD Waste/Ash sample, and Tests 7-12 are on the Ohio Fly Ash #1.

TABLE III

MOISTURE ADDITION LEVEL

| Test No. | Wt. % Water | Observations (Final Mix) |
|---|---|---|
| 1 | 50.8 | Wet and fluid |
| 2 | 34.3 | Wet and fluid |
| 3 | 26.1 | Wet and fluid |
| 4 | 21.1 | Damp mass tending to ball |
| 5 | 19.4 | Definite dough-like, but surface wet. |
| 6* | 17.9 | Tough, dough-like mass; very cohesive; surface appearance moist. |
| 7 | 7.6 | Dry, but forming damp balls up to ¼". |
| 8 | 15.3 | Mix is damp; forming damp balls up to ½" |
| 9 | 19.9 | Like 15.3 wt %, but a little damper. |
| 10 | 23.0 | Starting to get dough-like. |
| 11 | 23.6 | Mix is damp, but not thixotropic, starting to stick to bowl. |
| 12 | 24.2 | Looks thixotropic when smoothed with a spatula or vibrated. |

*When Test 6 conditions were reached, the mass tended not to stick to the mixing bowl or paddle.

These tests showed that the proper dough-like state was reached at 17.9% moisture in the Colorado FGD Waste/Ash sample, and at between 23.0 and 23.6% moisture in the Ohio Fly Ash No. 2 sample.

Subsequent mixes used for the column studies to determine the relative impermeability of the composites of this invention were made in the laboratory mortar mixer employing the visual end points described above as the operational guide.

II B. Hold Time

Depending on the landfill design configuration, in some cases swelling of the emplaced composite could rupture the landfull cover, bottom or side walls. Thus, where this could be a problem, it is necessary to permit the composite mixes to swell before covering, or possibly, before emplacing. Accordingly, several composite mixes of the invention were subjected to one-dimensional swell consolidometer studies to determine the percentage of such swelling which occurs after a given holding period. These studies show that the holding period before covering ranges from about 0.5 to about 8 hours. Thus, we prefer to let the composite swell, either unconfined or confined (compacted), before covering for such a period in cases where landfill integrity could be compromised by a swelling-caused breach. The holding can occur in open set-aside piles, during transportation to the fill, or at the fill site before, during or after compaction, but before covering with barrier layer(s), e.g. of clay.

The composite mixes to be tested were placed into stainless steel rings 1 15/16 inch I.D. by 1¼ inch high. The mixes were compacted to produce samples having effective heights of one inch. Porous media were placed above and below the samples, and the rings were then placed into a plastic cup that could be filled with water if required. The test rings containing the samples were then placed into the consolidometer test unit, and the swell or shrink in the sample was measured using a dial indicator. The movement experienced was compared to the initial dial indicator reading to determine shrink or swell. Additional weight could be added to the unit to exert a downward force on the specimen during the testing.

In each test series, six identical samples were prepared. The first was placed immediately after mixing in the consolidometer test unit. The dial was read and the sample was left in the apparatus for up to five days to allow attainment of maximum swell and equilibration. The final reading was then taken and the % swell calculated.

The second sample was let hold (i.e., permitted to swell, free of constraint) for a 1 hour period before being placed in the consolidometer and the procedure repeated. The third was let set 2 hours, and so on, with the sixth in holding for 5 hours before placement in the consolidometer.

Series I. In this series, the swell was determined for samples containing 52.2 dry wt % Ohio Fly Ash No. 1, 42.8 dry wt % sodium sulfate/sulfite/carbonate mix (the high Sodium Sulfite mix described above), 5.0 dry wt % Kansas Soil, and 18.0% water. In this series a downward force of 1.8 lb/sq. in. was applied to the samples. The samples were sealed in plastic membranes during the test. The results of those studies are:

Series I

| Holding Time In Hours After Mixing | % Additional Swell After 5 Days |
|---|---|
| 0 | 10.3 |
| 1 | 6.0 |
| 2 | 3.8 |
| 3 | 1.9 |
| 4 | 0.5 |
| 5 | −0.1 |

These data show that the sample that was tested immediately after mixing showed over 10% swell, and that after holding (setting) for five hours after mixing, the measured swell was less than 0% (i.e., some slight shrinkage occurred). This indicates that some hold time should be allowed after mixing and before covering if no swell is desired in a compacted body.

Series II. In this series, swell was determined for a composite mix under a greater loading than was used in Series I. The composite mix used in this series was 52.2% dry wt % Ohio Fly Ash No. 3, 42.8% dry wt % sodium sulfate/sulfite/carbonate mix described above in Series I, 5.0% dry wt % Kansas Soil, and 21.7% water. In these tests 4.0 lb/sq.in. downward force was applied to the specimens. As in Series I the samples were sealed in plastic membranes during the test. The results of these studies are:

Series II

| Holding Time in Hours After Mixing | % Additional Swell After 5 Days |
|---|---|
| 0 | 19.5 |
| 1 | 14.6 |
| 2 | 2.9 |
| 3 | 0.2 |
| 4 | 1.4 |
| 5 | 2.3 |

These data show that letting the mix set for three hours after mixing reduced the additional swell from 19.5% to 0.2%, but that slight swell was again noted in mixes that were allowed to hold (set) for four and five hours prior to test.

Series III. Samples were prepared from composite mix containing various amounts of Ohio Fly Ash No. 2 and Ground Sodium Sulfate. One half of each of these mixes was allowed to hold for five hours after mixing prior to testing, and one half of each of the mixes was testing immediately after mixing (zero hold time). These samples were tested using 1.8 lb/sq.in. downward force. All samples were sealed in plastic membranes during testing. The results of those tests, after 5 days of testing when swells were equilibrated, are:

Series III

| Dry Wt % | | | | % Additional Swell (Holding Time Prior to Testing) | |
|---|---|---|---|---|---|
| Ohio Fly Ash | Sodium Sulfate | Volclay | % Water | 0 hr | 5 hr |
| 96.7 | 2.0 | 1.3 | 23.8 | −0.1 | −0.1 |
| 93.6 | 5.1 | 1.3 | 22.0 | 0.0 | −0.1 |
| 88.8 | 9.9 | 1.3 | 20.4 | 3.5 | 3.0 |
| 85.0 | 13.9 | 1.1 | 21.5 | 7.7 | 3.0 |
| 78.7 | 20.0 | 1.3 | 21.5 | 15.6 | 0.9 |

The data shows that: (1) The percent swells noted in samples tested immediately after mixing tended to increase with increasing sodium sulfate content (decreasing fly ash content); and, (2) All swells noted in samples held for five hours after mixing were lower than the swells noted in samples tested immediately after mixing.

Series IV. Tests were performed using only the Colorado FGD Waste/Ash mixture with various amounts and types of water addition in order to simulate prior art landfill breach problems. The results of those studies are:

A. The Colorado FGD Waste/Ash material containing 17.9% moisture was hand compacted into a test ring. The loading was 0.5 lb/sq.in. With no water in the cell the sample showed no movement for five days. When water was added to the cell (representing a breach in prior art landfill), 14.3% swell was noted. The sample was not sealed in an impervious membrane.

B. The Colorado FGD Waste/Ash material was dry packed into a test ring using 1,000 lbs. pressure (resultant sample=88 lb/cu.ft.). The sample was tested using a loading of 0.5 lb/sq.in. The sample was placed in an impervious membrane during the test. After two days of testing in air the sample had shrunk −0.5%. At that point water was injected into the sample with a needle to produce a theoretical 18.0% moisture content. After this injection, the sample showed an additional 2.9% swell in the following 11 days.

C. The Colorado FGD Waste/Ash material was loose filled into a test ring (resultant sample=35 lb/cu.ft.). The sample was tested using a loading of 1.0 lb/sq.in. The sample was not sealed in an impervious membrane. After two days of testing in air the sample showed 0.4% shrinkage. At that point water was injected into the sample to produce a theoretical moisture content of 18.0%. After this injection, the sample showed an additional 1.1% swell in the following 11 days.

This series shows that the 1.1 to 14.3% swelling after water intrusion represents a design problem for unstabilized dry FGD waste landfills.

Series V. In this series, Ohio Fly Ash No. 1 and the sodium salt source (described above in Series I) were blended with various additives to form a composite of the invention. The moisture contents of all mixes were held at 18.0%. The loading on the samples was 1.8 lb/sq.in. All samples were tested in air inside impervious membranes. There was no hold time and the maximum swell developed within a few hours to 3 days. The results are:

Series V

| Wt % (Dry Basis) | | | Maximum |
|---|---|---|---|
| Ohio Fly Ash | Sodium Salts | Additive | % Swell |
| 55.0* | 45.0* | None | 19.6 |
| 55.0 | 45.0 | <0.1 Catfloc-C | 9.0 |
| 55.0 | 45.0 | <0.1 Catfloc-C | 10.1 |
| 53.9 | 44.1 | 2.0 Volclay | 10.6 |
| 53.9 | 44.1 | 2.0 Volclay | 8.8 |
| 55.0 | 45.0 | <0.1 Percol 351 | 11.9 |
| 52.2 | 42.8 | 5.0 Kansas Soil | 19.3 |

*This represents a simulated FGD waste mixtures of fly ash and sodium sulfate/sulfite/carbonate.

The swell of the composite containing Percol 351 flocculant showed a swell of 11.9% which is comparable to the swells noted for the samples containing Catfloc-C flocculant and the Volclay.

Series VI. In this series, the Colorado FGD Waste/Ash mixture was mixed with various additives at various moisture contents to form composites of the invention. Swell was determined using a loading of 1.8 lb/sq.in. All samples were tested in air inside of impervious membranes. There was no hold time. The maximum swell developed within 1–3 days. The results are:

Series VI

| Wt % (Dry Basis) | | | Maximum |
|---|---|---|---|
| Colo. FGD Waste/Ash Mixture | Additive | % Water | % Swell |
| 95.0 | 5.0 Volclay | 15.7 | 3.5 |
| 95.0 | 5.0 Volclay | 18.0 | 2.1 |
| 86.3 | <0.1 Catfloc-C | 13.7 | 2.0 |
| 98.0 | 2.0 Volclay | 15.3 | 2.5 |

The data shows: (1) Regarding the two mixes containing 5.0 Wt% Volclay, the one containing 15.7% water swelled 3.5% while the one containing 18.0% water swelled 2.1%. This may indicate that optimum water acts as a lubricant to promote better packing. (2) The sample containing 2.0 wt% Volclay and 15.3% moisture swelled 2.5%. This is 1.0% less swell than the sample containing 5.0% Volclay at a similar moisture content. This may indicate that lower additive amounts are the optimum amount of particle lubricant and thus can reduce swelling, even in the absence of a hold period. (3) The sample containing Catfloc-C swelled 2.0%. This swell is considerably lower than the 9–10% swell noted from samples containing 55.0% Ohio Fly Ash and the high Sodium Sulfite sodium salt source (described above in Series I).

III. Accelerated Percolation/Relative Impermeability Testing

The test columns were 4 inch diameter PVC plastic pipe, approximately 2 feet long fitted with a perforated disc at the bottom end. A piece of stainless steel screen (approximately 40 mesh) and a layer of coarse fiberglass were placed on top of the perforated disc. Two inches of sand were then placed on top of the fiberglass layer, and the composite mixes to be tested were compacted into the columns in four equal lifts. After the mixes were compacted to theoretical density (except where noted), 1 foot of deionized water was added above the composite in the columns and nitrogen pressure was used to simulate a ten (10) foot water head.

Daily measurements were made of any leakage. The columns were usually removed from test when essentially all of the original amount of water had percolated through under the 10 foot head pressure. In some cases the columns never leaked before they were taken out of service or the test terminated, even after many days (from 10 to over 150 days). For these columns it is not possible to calculate the permeability constant in cm/sec. But they are all clearly impervious with k values of well below $10^{-7}$, and could even be $10^{-11}$ or less.

Similarly, some of the comparative columns began leaking immediately. Some leaked so fast that it was not possible to measure the rates. Thus, while the permeability is not precisely known, it is clear that they are pervious or highly pervious with k values well above $10^{-6}$, and most likely in the $10^2$–$10^{-2}$ range.

The Tables P-I through P-XII below (P for Permeability studies) summarize the composition of the composite mixes within the scope of the invention and their corresponding permeabilities, in terms of the constant K of hydraulic conductivity and permeability in cm/sec. Some of the tables show comparative tests of compositions or components, e.g. ash alone, outside the scope of the invention. Any values of $10^{-6}$ or below are considered impermeable and any above that are pervious (permeable). The abbreviations for the ash types and additives are the same as above. All flocculants were added in amounts of less than 0.1 wt% dry basis.

Table P-I below shows as a comparative test a series of four test columns of dry ash or FGD waste, used as received, and tamped to 6" depth in the columns prior to the addition of the water. Due to packing difficulties (all materials were fluffy, dry powders) optimum dry density was probably not attained even though the columns were tamped. No sodium salt(s), clay or flocculants were used; no particular attention was paid to insure an optimum water content was present in the as-received materials. The water head broke through in minutes, showing that the permeability was certainly well above $10^{-6}$, and probably in the $10^{-1}$ to $10^0$ range. Clearly the raw ash or FGD waste can be highly permeable and unsuited for untreated landfilling.

TABLE P-I

Comparative Test of Untreated Components

| Col No. | Ash or Waste | Additives | Water % | Time, min. to Breakthru | K-Perm cm/sec |
|---|---|---|---|---|---|
| 176 | CO#2 | None | As received | 37 | $>10^{-6}$* |
| 177 | KY#2 | None | As received | 15 | $>10^{-6}$* |
| 178 | OFA#3 | None | As received | 38 | $>10^{-6}$* |
| 179 | CO-FGD Waste | None | As received | 63 | $>10^{-6}$* |

*Precise measurements were not possible due to the rapidity of breakthrough. Probably in the $10^{-1}$ to $10^0$ range.

Table P-II below shows as a comparative test a series of 6 test columns of ash mixed with flocculant, clay, soil, or calcium scrubber sludge alone. The data showed that even with water in the optimum range, but without the use of sodium salts, the requisite impermeability was not achieved. In short, the absence of the sodium salts results in mixes that are permeable.

TABLE P-II

Comparative Test of Mixes Lacking Sodium Salts

| Col No. | OFA-1 % | Additives % | Water % | Time of Days | K-Perm cm/sec |
|---|---|---|---|---|---|
| 20 | 100.0 | PERCOL | 18.5 | 0 | $>10^{-6}$* |
| 19 | 98.8 | 1.2 VOL | 18.5 | 0 | $>10^{-6}$* |
| 21 | 98.8 | 1.2 VOL + PERCOL | 18.5 | 0 | $>10^{-6}$* |
| 32 | 90.6 | 9.4 SCRB SLDG | 20.5 | 0 | $>10^{-6}$* |
| 28 | 95.0 | 5.0 ILL-C | 18.5 | 0 | $>10^{-6}$* |
| 29 | 89.9 | 10.1 ILL-C | 18.5 | 0 | $>10^{-6}$* |

*Precise measurements were not possible due to the rapidity of breakthrough.

Table P-III below is a series of composites in accord with the invention which show stabilization of composites having from 1.9% to 87.4% of the CO FGD waste. The mixes were packed into the columns immediately after mixing. The CO FGD waste was a mix of fly ash and spent Nahcolite, containing 12.5% $Na_2SO_x$ salts, where x is 3 or 4, and some minor amounts of $Na_2CO_3$ and possibly some unreacted $NaHCO_3$. The value under the FGD% column is the total FGD waste in the mix. The value under the SS (sodium salt) % column is the amount of sodium sulfate/sulfite/carbonate in the composite. The "K-Perm" values listed as "$<10^{-7}$" are all well below $10^{-7}$ as there was either no leakage before the columns were taken down or the columns were still in service after 153 days with no breakthrough.

TABLE P-III

FGD Composite Impermeabilities

| Col No | FGD % | SS % | Additive % | Water % | Days No Leak | K-Perm cm/sec |
|---|---|---|---|---|---|---|
| 1A | 1.9 | 0.3 | 97.8 DCS | 18.5 | 15 | $<10^{-7}$ |
| 1B | 1.9 | 0.3 | 97.8 DCS | 18.5 | 15 | $<10^{-7}$ |
| 3A | 1.9 | 0.3 | 97.8 DCS + OIL | 18.5 | 15 | $<10^{-7}$ |
| 3B | 1.9 | 0.3 | 97.8 DCS + OIL | 18.5 | 15 | $<10^{-7}$ |
| 4A | 1.9 | 0.3 | 97.8 DCS + PERCOL | 18.5 | 15 | $<10^{-7}$ |
| 4B | 1.9 | 0.3 | 97.8 DCS + PERCOL | 18.5 | 15 | $<10^{-7}$ |
| 5A | 1.9 | 0.3 | 97.8 DCS + OIL + PERCOL | 18.5 | 15 | $<10^{-7}$ |
| 5B | 1.9 | 0.3 | 97.8 DCS + OIL + PERCOL | 18.5 | 15 | $<10^{-7}$ |
| 2B-2 | 43.7 | 6.3 | 50.0 DCS | 14.4 | 20 | $<10^{-7}$ |
| 6 | 43.7 | 6.3 | 50.0 DCS | 16.5 | 15 | $<10^{-7}$ |
| 17 | 78.6 | 11.3 | 10.1 DCS | 18.5 | 25 | $2.0 \times 10^{-8}$ |
| 18 | 83.1 | 11.9 | 5.0 DCS | 18.5 | 1 | $2.9 \times 10^{-7}$ |
| 49 | 83.1 | 11.9 | 5.0 DCS | 18.5 | 153 | $<10^{-7}$ |
| 2A | 85.5 | 12.3 | 2.2 DCS | 18.5 | 15 | $<10^{-7}$ |
| 11 | 85.5 | 12.3 | 2.2 DCS | 18.5 | 12 | $5.4 \times 10^{-8}$ |
| 16 | 85.5 | 12.3 | 2.1 DCS | 20.0 | 9 | $2.8 \times 10^{-8}$ |
| 48 | 85.5 | 12.3 | 2.2 DCS + CAT-C | 18.5 | 153 | $<10^{-7}$ |
| 74 | 85.5 | 12.3 | 1.7 LFS + 0.5 VOL | 18.5 | 1 | $1.2 \times 10^{-6}$ |
| 63 | 83.1 | 11.9 | 4.5 LFS + 0.5 VOL | 18.5 | 90 | $<10^{-7}$ |
| 9 | 86.4 | 12.4 | 1.2 VOL | 18.5 | 77 | $3.6 \times 10^{-9}$ |
| 10 | 86.4 | 12.4 | 1.2 VOL | 18.5 | 117 | $3.9 \times 10^{-9}$ |
| 60 | 85.7 | 12.3 | 2.2 VOL | 19.4 | 131 | $<10^{-7}$ |
| 61 | 87.4 | 12.6 | CHEM | 18.3 | 126 | $<10^{-7}$ |
| 47 | 87.4 | 12.6 | CAT-C | 19.4 | 153 | $<10^{-7}$ |
| 8 | 87.4 | 12.6 | PERCOL | 18.5 | 98 | $2.4 \times 10^{-9}$ |

Table P-IV below is a comparative test series that demonstrates optimum water criticality for composite impermeability. The FGD was the CO FGD waste described above for Table P-III.

TABLE P-IV

| Col No | Waste or Ash % | SS % | Additive % | Water % | Time No Leak Days | K-Perm cm/sec |
|---|---|---|---|---|---|---|
| 2B-1 | 85.5* | 12.3 | 2.2 DCS | 10.2 | 0 | $>10^{-6}$ |
| 13 | 85.5* | 12.3 | 2.2 DCS | 10.2 | 0 | $>10^{-6}$ |
| 14 | 85.5* | 12.3 | 2.2 DCS | 14.0 | 0 | $>10^{-6}$ |
| 7 | 87.4* | 12.6 | NONE | 18.5 | 11 | $5.8 \times 10^{-7}$ |
| 167 | 45.0 | 55.0$^a$ | NONE | 17.2 | 13 | $<10^{-7}$ |
| 168 | 30.1 | 69.9$^a$ | NONE | 16.6 | 13 | $<10^{-7}$ |
| 15 | 87.4* | 12.6 | NONE | 10.0 | 0 | $>10^{-6}$ |
| 68 | 100.0 | NONE | NONE | 22.8 | 1 | $3.5 \times 10^{-6}$ |

*CO FGD Waste
$^a$ = ground sodium sulfate

Columns 2B-1, 13 and 14 should be compared to columns 2A, 11 and 16 in Table P-III. The 10.2% and 14% values of water in columns in 2B-1, 13 and 14 were too low, and there was quick breakthrough. But when the water content is in the proper range for this waste or ash to be disposed, e.g. around 18.5–20%, the permeability suddenly drops to the $10^{-6}$ range and below as seen in Columns 2A, 11 and 16. Columns 7 and 15 in Table P-IV also show this water criticality aspect of the invention. In comparing column 7 to columns 2A, 11, 16 and 48, there is at least a 10-fold increase in impermeability by use of the additives with the sodium salts as compared to no additives. Column 7 shows that sodium salts alone added to fly ash at proper water percentages can produce a composite in the impermeable range, but in comparing 7 to 2A, 11, 16 and 48 we see progressive lowering of the permeability (greater impermeability) by use of the appropriate additives. Columns 7, 167 and 168 show that with the critical wastes percentage, ash plus sodium salts can be rendered impermeable even without additives of clay or flocculant.

Column 68 is typical of a fly ash of the self-hardening bituminous coal type having low mean mass diameter, high solubles, and high in calcium hydroxide. Such ashes may exhibit properties of a pozzolan, i.e. a siliceous or siliceous and aluminous material which in itself possesses little cementitious value, but will, in finely divided form, and in the presence of moisture, chemically react with $Ca(OH)_2$ at ordinary temperatures to form compounds possessing cementitious properties. Such ashes may be marginally impermeable, are typically not easily compacted if set, and may be site-specifically approvable for disposal without treatment by the process of this invention. However, even pozzolanic ashes can be used in the composites of this invention to improve their impermeability values.

The following Tables P-V through P-XII list data on columns containing increasing amounts of sodium salts (SS), from 2% to 75%, and decreasing amounts of Fly Ash and other additives (clay, clay-containing soil, or flocculant; called "FA+A" in the tables below), from 98% to 25%. The 2% SS/98% FA+A (Table P-I) columns are examples of using the sodium salts to stabilize/impermeabilize waste ashes, and the 25% FA+A/75% SS (Table P-XII) columns are examples of using FA+A to stabilize/impermeabilize sodium sorbent FGD wastes. The data on the 25% FA+A and 75% SS (Table P-XII) indicates that at very high SS percentages, the formulation is a bit more sensitive, and we may be approaching the limit of SS disposal. For example, columns 90, 102 and 148 (Table P-XII) indicate that 5% Kansas soil (of which only 16.2% is Mg-rich montmorillonite) is too little additive, 10% would be marginal (by extrapolation), and 15–20% is clearly adequate. Other soils may be required in smaller or larger percentages depending on the smectite clay content. The Column 148 was also too wet.

Column 147 in Table P-XII illustrates that the flocculants tend to function as water enhancers. Thus, in adding flocculant the water content should be reduced, if near the upper limit of water. Conversely, less water may be used to reach theoretical density and compaction. The proportion is approximately 10–30x; that is, for each 0.1% flocculant the water content can be reduced 1.0–3.0%. Thus column 147 as compared to column 91 (also in Table P-XII) indicates the water/flocculant content of Column 147 is too high, being effectively 24–26%, while in column 91 it is only 20.5–22.5%. Similarly columns 151 and 120 in Table P-V tend to show that high clay content may act similarly with water, as does flocculant, at least for low sodium salt concentrations. In six of the nine Tables P-VI through P-VII and P-X through P-XII wherein flocculants were tested (parts A and B of Tables P-X through P-XII being each counted as a table), the average water content for composite mixes containing flocculants were lower than the mixes not containing flocculants.

In the Tables below GSS means Ground Sodium Sulfate, SS means sodium sulfite/sulfate/carbonate as described above. The R following the column number indicates that the composite was permitted to set in the column for a period of time (on the order of 5 hours) before the column was put into test by loading with the water head.

TABLE P-V

98% FA + A/2% SODIUM SALTS

A. Columns Containing GSS

| COL NO. | FLY ASH TYPE | % | GSS % | ADDITIVE % | WATER % | DAYS NO LEAK | K-PERM cm/sec |
|---|---|---|---|---|---|---|---|
| 82 | AFA-1 | 96.9 | 2.0 | 1.1 VOL | 19.5 | 3 | $8.9 \times 10^{-7}$ |
| 134 | AFA-2 | 88.1 | 2.0 | 10.0 DCS | 25.8 | 2 | $9.4 \times 10^{-7}$ |
| 70 | OFA-2 | 96.7 | 2.0 | 1.3 VOL | 23.8 | 1 | $6.4 \times 10^{-7}$ |
| 76R | OFA-2 | 96.7 | 2.0 | 1.3 VOL | 23.8 | 1 | $3.5 \times 10^{-6}$ |

B. Columns Containing SS

| COL NO. | FLY ASH TYPE | % | SS % | ADDITIVE % | WATER % | DAYS NO LEAK | K-PERM cm/sec |
|---|---|---|---|---|---|---|---|
| 118 | AFA-2 | 95.6 | 1.9 | 2.5 VOL | 27.3 | 2 | $6.2 \times 10^{-7}$ |
| 132 | AFA-2 | 95.6 | 2.0 | 2.4 VOL | 28.9 | 2 | $9.3 \times 10^{-7}$ |
| 133 | AFA-2 | 94.5 | 1.9 | 3.6 VOL | 30.6 | 2 | $4.1 \times 10^{-7}$ |
| 119 | AFA-2 | 94.4 | 2.0 | 3.6 VOL | 30.8 | 3 | $4.2 \times 10^{-7}$ |
| 151 | AFA-2 | 88.2 | 1.9 | 9.9 VOL | 26.1 | 2 | $7.4 \times 10^{-7}$ |

TABLE P-V-continued

98% FA + A/2% SODIUM SALTS

| 120 | AFA-2 | 88.2 | 1.8 | 10.0 VOL | 29.5 | 2 | $1.4 \times 10^{-6}$ |
|---|---|---|---|---|---|---|---|

TABLE P-VI

98% FA + A/5% SODIUM SALTS

A. Columns Containing GSS

| COL NO | FLY ASH TYPE | % | GSS % | ADDITIVE % | WATER % | DAYS NO LEAK | K-PERM cm/sec |
|---|---|---|---|---|---|---|---|
| 83 | AFA-1 | 93.7 | 5.0 | 1.3 VOL | 20.2 | 3 | $1.1 \times 10^{-6}$ |
| 104 | AFA-1 | 93.0 | 5.0 | 2.0 VOL | 19.8 | 1 | $3.8 \times 10^{-7}$ |
| 153 | AFA-1 | 93.0 | 5.0 | 2.0 VOL | 15.7 | 4 | $7.3 \times 10^{-7}$ |
| 105 | AFA-1 | 92.0 | 5.0 | 3.0 VOL | 20.4 | 1 | $9.3 \times 10^{-7}$ |
| 154 | AFA-1 | 92.0 | 5.0 | 3.0 VOL | 14.2 | 4 | $7.6 \times 10^{-7}$ |
| 135 | AFA-2 | 85.5 | 4.5 | 10.0 DCS | 24.8 | 2 | $1.2 \times 10^{-6}$ |
| 136 | AFA-2 | 81.0 | 4.1 | 14.9 DCS | 24.9 | 2 | $3.3 \times 10^{-7}$ |
| 71 | OFA-2 | 93.8 | 5.0 | 1.3 VOL | 23.8 | 1 | $6.4 \times 10^{-7}$ |
| 77 | OFA-2 | 93.6 | 5.1 | 1.2 VOL | 18.5 | 1 | $2.9 \times 10^{-6}$ |
| 114 | KFA-1 | 91.4 | 5.0 | 3.6 VOL | 20.7 | 1 | $1.9 \times 10^{-6}$ |
| 115 | KFA-1 | 90.1 | 5.1 | 4.8 VOL | 21.0 | 3 | $2.5 \times 10^{-6}$ |
| 117 | KFA-1 | 95.2 | 4.8 | CAT-C | 21.1 | 1 | $7.8 \times 10^{-6}$ |
| 141 | KFA-1 | 80.9 | 4.1 | 15.0 KAN | 19.9 | 2 | $6.9 \times 10^{-7}$ |

B. Columns Containing SS

| COL NO | FLY ASH TYPE | % | SS % | ADDITIVE % | WATER % | DAYS NO LEAK | K-PERM cm/sec |
|---|---|---|---|---|---|---|---|
| 98 | AFA-1 | 93.7 | 5.1 | 1.2 VOL | 19.4 | 2 | $1.1 \times 10^{-6}$ |
| 121 | AFA-2 | 92.6 | 4.9 | 2.5 VOL | 28.4 | 2 | $5.9 \times 10^{-7}$ |
| 152 | AFA-2 | 92.6 | 4.9 | 2.5 VOL | 24.2 | 1 | $3.5 \times 10^{-6}$ |
| 122 | AFA-2 | 91.6 | 4.8 | 3.6 VOL | 29.5 | 2 | $1.3 \times 10^{-6}$ |
| 123 | AFA-2 | 85.5 | 4.5 | 10.0 DCS | 24.8 | 2 | $1.6 \times 10^{-6}$ |
| 124 | AFA-2 | 81.0 | 4.1 | 14.9 DCS | 24.9 | 2 | $7.3 \times 10^{-7}$ |

TABLE P-VII

90% FA + A/10% SODIUM SALTS

A. Columns Containing GSS

| COL NO | FLY ASH TYPE | % | GSS % | ADDITIVE % | WATER % | DAYS NO LEAK | K-PERM cm/sec |
|---|---|---|---|---|---|---|---|
| 84 | AFA-1 | 89.0 | 9.8 | 1.2 VOL | 19.4 | 3 | $9.5 \times 10^{-8}$ |
| 92 | AFA-1 | 88.0 | 10.0 | 2.0 VOL | 18.5 | 2 | $7.8 \times 10^{-7}$ |
| 93 | AFA-1 | 86.4 | 10.6 | 3.0 VOL | 20.1 | 5 | $3.1 \times 10^{-8}$ |
| 137 | AFA-2 | 81.0 | 9.0 | 10.0 DCS | 24.2 | 2 | $1.4 \times 10^{-6}$ |
| 138 | AFA-2 | 76.5 | 8.5 | 15.0 DCS | 24.6 | 2 | $7.9 \times 10^{-7}$ |
| 72 | OFA-2 | 88.9 | 9.9 | 1.2 VOL | 20.1 | 1 | $4.0 \times 10^{-7}$ |
| 78R | OFA-2 | 88.8 | 9.9 | 1.3 VOL | 20.4 | 1 | $9.4 \times 10^{-7}$ |
| 81 | KFA-1 | 88.9 | 9.9 | 1.2 VOL | 22.4 | 1 | $3.6 \times 10^{-6}$ |
| 112 | KFA-1 | 87.6 | 10.0 | 2.4 VOL | 20.8 | 1 | $6.4 \times 10^{-6}$ |
| 113 | KFA-1 | 86.3 | 10.0 | 3.7 VOL | 21.1 | 1 | $1.9 \times 10^{-6}$ |
| 116 | KFA-1 | 90.0 | 10.0 | CAT-C | 21.3 | 1 | $7.1 \times 10^{-6}$ |
| 142 | KFA-1 | 76.5 | 8.3 | 15.0 KAN | 19.9 | 2 | $4.3 \times 10^{-7}$ |

B. Columns Containing SS

| COL NO | FLY ASH TYPE | % | SS % | ADDITIVE % | WATER % | DAYS NO LEAK | PERM cm/sec |
|---|---|---|---|---|---|---|---|
| 125 | AFA-2 | 87.9 | 9.7 | 2.4 VOL | 24.2 | 2 | $1.5 \times 10^{-6}$ |
| 139 | AFA-2 | 87.9 | 9.7 | 2.4 VOL | 26.1 | 2 | $7.6 \times 10^{-7}$ |
| 140 | AFA-2 | 86.9 | 9.5 | 3.6 VOL | 27.5 | 2 | $1.5 \times 10^{-7}$ |
| 126 | AFA-2 | 86.8 | 9.5 | 3.7 VOL | 26.4 | 2 | $2.3 \times 10^{-7}$ |
| 127 | AFA-2 | 81.0 | 9.0 | 10.0 DCS | 23.3 | 3 | $4.0 \times 10^{-8}$ |
| 128 | AFA-2 | 76.6 | 8.4 | 15.0 DCS | 23.0 | 3 | $4.4 \times 10^{-7}$ |
| 99 | AFA-1 | 89.8 | 9.0 | 1.2 VOL | 17.9 | 7 | $1.3 \times 10^{-6}$ |

TABLE P-VIII

85% FA + A/15% SODIUM SALTS

A. Columns Containing GSS

| COL NO. | FLY ASH TYPE | % | GSS % | ADDITIVE % | WATER % | DAYS NO LEAK | K-PERM cm/sec |
|---|---|---|---|---|---|---|---|
| 85 | AFA-1 | 84.0 | 14.8 | 1.2 VOL | 19.3 | 3 | $3.1 \times 10^{-8}$ |
| 79R | OFA-2 | 84.0 | 14.7 | 1.1 VOL | 21.5 | 1 | $1.5 \times 10^{-7}$ |
| 73 | OFA-2 | 84.0 | 14.7 | 1.3 VOL | 22.6 | 1 | $1.7 \times 10^{-7}$ |
| 87 | OFA-2 | 80.0 | 15.0 | 5.0 KAN | 22.9 | 1 | $3.2 \times 10^{-6}$ |

TABLE P-VIII-continued

85% FA + A/15% SODIUM SALTS

| COL NO | FLY ASH TYPE | % | | ADDITIVE % | WATER % | DAYS NO LEAK | K-PERM cm/sec |
|---|---|---|---|---|---|---|---|
| 88 | OFA-2 | 74.9 | 15.0 | 10.1 KAN | 20.9 | 1 | $1.1 \times 10^{-6}$ |
| 108 | OFA-2 | 70.2 | 14.9 | 14.9 KAN | 23.7 | 2 | $1.5 \times 10^{-6}$ |
| 109 | OFA-2 | 70.2 | 14.9 | 14.9 KAN + CAT-C | 22.2 | 1 | $2.1 \times 10^{-7}$ |

B. Columns Containing SS

| COL NO | FLY ASH TYPE | % | SS % | ADDITIVE % | WATER % | DAYS NO LEAK | K-PERM cm/sec |
|---|---|---|---|---|---|---|---|
| 100 | AFA-1 | 84.2 | 14.6 | 1.2 VOL | 18.3 | 13 | $1.2 \times 10^{-7}$ |
| 129 | AFA-2 | 82.9 | 14.6 | 2.5 VOL | 23.3 | 7 | $7.2 \times 10^{-8}$ |
| 130 | AFA-2 | 76.5 | 13.5 | 10.0 DCS | 21.3 | 7 | $5.8 \times 10^{-7}$ |
| 131 | AFA-2 | 72.2 | 12.8 | 15.0 DCS | 22.0 | 7 | $3.8 \times 10^{-7}$ |

TABLE P-IX

80% FA + A/20% SODIUM SALTS (GSS)

| COL NO | FLY ASH TYPE | % | GSS % | ADDITIVE % | WATER % | DAYS NO LEAK | K-PERM cm/sec |
|---|---|---|---|---|---|---|---|
| 86 | AFA-1 | 78.8 | 20.0 | 1.2 VOL | 19.7 | 83 | $<10^{-7}$ |
| 75 | OFA-2 | 78.7 | 20.0 | 1.3 VOL | 21.0 | 7 | $8.9 \times 10^{-8}$ |
| 80R | OFA-2 | 78.7 | 20.0 | 1.3 VOL | 21.5 | 5 | $1.8 \times 10^{-8}$ |

TABLE P-X

55% FA + A/45% SODIUM SALTS

A. Columns Containing GSS

| COL NO | FLY ASH TYPE | % | GSS % | ADDITIVE % | WATER % | DAYS NO LEAK | K-PERM cm/sec |
|---|---|---|---|---|---|---|---|
| 53 | OFA-1 | 53.9 | 44.1 | 2.0 KAN | 17.5 | 103 | $4.8 \times 10^{-6}$ |
| 54 | OFA-1 | 52.2 | 42.8 | 5.0 KAN | 19.4 | 131 | $<10^{-7}$ |
| 52 | OFA-1 | 54.3 | 44.4 | 1.3 VOL | 19.2 | 131 | $<10^{-7}$ |
| 51 | OFA-1 | 55.0 | 45.0 | CAT-LV | 16.7 | 131 | $<10^{-7}$ |
| 62 | OFA-1 | 55.0 | 45.0 | CHEM | 18.3 | 126 | $<10^{-7}$ |
| 69 | OFA-1 | 55.0 | 45.0 | CAT-C | 20.0 | 90 | $<10^{-7}$ |
| 65 | OFA-2 | 52.3 | 42.8 | 4.9 KAN | 22.6 | 32 | $8.8 \times 10^{-8}$ |

B. Columns Containing SS

| COL NO | FLY ASH TYPE | % | SS % | ADDITIVE % | WATER % | DAYS NO LEAK | K-PERM cm/sec |
|---|---|---|---|---|---|---|---|
| 31 | OFA-1 | 50.0 | 40.9 | 9.1 DCS | 19.4 | 193 | $<10^{-7}$ |
| 30 | OFA-1 | 52.4 | 42.8 | 4.8 DCS | 19.4 | 193 | $<10^{-7}$ |
| 37 | OFA-1 | 52.2 | 42.8 | 5.0 KAN | 21.0 | 156 | $<10^{-7}$ |
| 36 | OFA-1 | 53.9 | 44.1 | 2.0 KAN | 20.1 | 156 | $<10^{-7}$ |
| 26 | OFA-1 | 54.3 | 44.4 | 1.3 VOL | 19.4 | 227 | $<10^{-7}$ |
| 27 | OFA-1 | 54.3 | 44.4 | 1.3 VOL + CAT-C | 19.4 | 227 | $<10^{-7}$ |
| 25 | OFA-1 | 55.0 | 45.0 | CAT-LV | 19.4 | 235 | $<10^{-7}$ |
| 33 | OFA-1 | 55.0 | 45.0 | CHEM | 19.2 | 179 | $<10^{-7}$ |
| 22 | OFA-1 | 55.0 | 45.0 | PERCOL | 18.5 | 247 | $<10^{-7}$ |
| 24 | OFA-1 | 55.0 | 45.0 | CAT-C | 19.2 | 235 | $<10^{-7}$ |
| 64 | OFA-2 | 52.3 | 42.8 | 4.9 KAN | 22.9 | 90 | $<10^{-7}$ |

TABLE P-XI

40%/FA + A/60% SODIUM SALTS

A. Columns Containing GSS

| COL NO | FLY ASH TYPE | % | GSS % | ADDITIVE % | WATER % | DAYS NO LEAK | K-PERM cm/sec |
|---|---|---|---|---|---|---|---|
| 55 | OFA-1 | 39.2 | 58.8 | 2.0 KAN | 17.9 | 131 | $<10^{-7}$ |
| 56 | OFA-1 | 38.0 | 57.1 | 4.9 KAN | 17.1 | 131 | $<10^{-7}$ |
| 57 | OFA-1 | 36.0 | 54.0 | 10.0 KAN | 17.1 | 131 | $<10^{-7}$ |
| 59 | OFA-1 | 39.4 | 59.3 | 1.3 VOL | 17.1 | 131 | $<10^{-7}$ |
| 58 | OFA-1 | 39.9 | 60.1 | CAT-C | 16.3 | 131 | $<10^{-7}$ |
| 67 | OFA-2 | 38.0 | 57.0 | 5.0 KAN | 19.0 | 90 | $<10^{-7}$ |
| 103 | OFA-2 | 30.3 | 60.7 | 9.0 KAN | 21.1 | 87 | $<10^{-7}$ |

B. Columns Containing SS

| COL NO | FLY ASH TYPE | % | SS % | ADDITIVE % | WATER % | DAYS NO LEAK | K-PERM cm/sec |
|---|---|---|---|---|---|---|---|
| 40 | OFA-1 | 36.0 | 54.0 | 10.0 KAN | 20.1 | 156 | $<10^{-7}$ |
| 39 | OFA-1 | 37.9 | 57.1 | 5.0 KAN | 20.1 | 156 | $<10^{-7}$ |
| 38 | OFA-1 | 39.2 | 58.8 | 2.0 KAN | 20.7 | 156 | $<10^{-7}$ |

TABLE P-XI-continued

| | | | 40%/FA + A/60% SODIUM SALTS | | | |
|---|---|---|---|---|---|---|
| 42 | OFA-1 | 39.5 | 59.3 | 1.2 VOL | 19.2 | 156 | $<10^{-7}$ |
| 41 | OFA-1 | 40.0 | 60.0 | CAT-C | 21.0 | 156 | $<10^{-7}$ |
| 66 | OFA-2 | 38.0 | 57.0 | 5.0 KAN | 24.5 | 90 | $<10^{-7}$ |

TABLE P-XII

25% FA + A/75% SODIUM SALTS

A. Columns Containing GSS

| COL NO | FLY ASH TYPE | % | GSS % | ADDITIVE % | WATER % | DAYS NO LEAK | K-PERM cm/sec |
|---|---|---|---|---|---|---|---|
| 101 | OFA-2 | 24.7 | 74.3 | 1.0 VOL | 22.4 | 88 | $<10^{-7}$ |
| 106 | OFA-2 | 24.5 | 73.4 | 2.1 VOL | 24.8 | 80 | $<10^{-7}$ |
| 97 | OFA-2 | 24.5 | 73.6 | 1.9 VOL | 22.0 | 77 | $<10^{-7}$ |
| 110 | OFA-2 | 24.2 | 72.8 | 3.0 VOL | 20.7 | 73 | $<10^{-7}$ |
| 90 | OFA-2 | 23.7 | 71.3 | 5.0 KAN | 19.5 | 0 | $>10^{-6}$ |
| 102 | OFA-2 | 23.7 | 71.3 | 5.0 KAN | 22.9 | 0 | $>10^{-6}$ |
| 107 | OFA-2 | 21.3 | 63.7 | 15.0 KAN | 23.5 | 24 | $4.9 \times 10^{-7}$ |
| 143 | OFA-2 | 20.0 | 60.0 | 20.0 KAN | 21.6 | 26 | $5.5 \times 10^{-8}$ |
| 91 | OFA-2 | 25.0 | 75.0 | CAT-C | 19.5 | 77 | $<10^{-7}$ |

B. Columns Containing SS

| COL NO | FLY ASH TYPE | % | SS % | ADDITIVE % | WATER % | DAYS NO LEAK | K-PERM cm/sec |
|---|---|---|---|---|---|---|---|
| 144 | OFA-3 | 24.5 | 74.3 | 1.2 VOL | 22.3 | 49 | $<10^{-7}$ |
| 145 | OFA-3 | 23.1 | 74.5 | 2.4 VOL | 23.3 | 49 | $<10^{-7}$ |
| 146 | OFA-3 | 23.6 | 72.8 | 3.6 VOL | 24.5 | 49 | $<10^{-7}$ |
| 148 | OFA-3 | 23.8 | 71.2 | 5.0 KAN | 24.7 | 0 | $>10^{-6}$ |
| 149 | OFA-3 | 22.5 | 67.5 | 10.0 KAN | 22.4 | 49 | $<10^{-7}$ |
| 150 | OFA-3 | 24.2 | 61.4 | 14.4 KAN | 23.1 | 49 | $<10^{-7}$ |
| 147 | OFA-3 | 25.0 | 75.0 | CAT-C | 22.9 | 0 | $>10^{-6}$ |

It should be understood that various modifications within the scope of this invention can be made by one of ordinary skill in the art without departing from the spirit thereof. For example, Nahcolite and other sodium salts such as hydrated $Na_2CO_3$, commercial sodium bicarbonate, dense or light soda ash, Trona, sodium sesquicarbonate, Wegscheiderite or the like, or mixtures thereof, may be used as the sodium salt component. We therefore wish our invention to be defined by the scope of the appended claims as broadly as the prior art will permit, and in view of this specification if need be.

We claim:

1. A method of preparing waste fossil fuel ash for disposal comprising the steps of:
   (a) providing waste fossil fuel ash;
   (b) introducing a sodium sulfur oxide salt compound into said ash in the range of from about 5 to 85 weight % on a dry basis;
   (c) said sodium sulfur oxide salt compound being selected from $Na_2SO_x$, where x is 3 or 4, $NaHCO_3$, and mixtures thereof;
   (d) said sodium sulfur oxide compound and said ash comprising an ash/sodium oxide salt composite; and
   (e) adjusting the water content of said composite to have from about 15 to about 28% by weight water content to produce a substantially homogenous, substantially impermeable wetted composite mass in non-pellet form having a coefficient of permeability value below about $10^{-6}$ cm/sec suitable for substantially solid mass landfill disposal without heat sintering.

2. A method as in claim 1 which includes the added step of:
   (a) mixing said composite with a source of smectite clay in an amount in the range of below about 5 weight percent dry basis, in the presence of sufficient water to produce an additive-enhanced wetted composite having said water content.

3. A method as in claim 2 which includes the added step of:
   (a) permitting said wetted composite to swell for a holding period of time sufficient that swelling substantially ceases before disposal is completed.

4. A method as in claim 2 wherein:
   (a) amount of water is an amount sufficient to produce a composite of dough-like texture.

5. A method as in claim 1 wherein:
   (a) said wetted composite is let set for a time sufficient to achieve a penetration resistance of about 4.5 tons/sq.ft.

6. A method as in claim 2 which includes the added step of:
   (a) disposing of said additive-enhanced composite in a compacted landfill.

7. A method as in claim 2 wherein:
   (a) said ash is a mixture of fly ash and bottom ash.

8. A method as in claim 7 wherein:
   (a) said bottom ash is present in an amount of up to about 80% by weight of the entire ash mixture, and the balance is fly ash.

9. A method as in claim 8 wherein:
   (a) said bottom ash comprises ash particles of size on the order of 60% by weight less than 10 US standard sieve mesh.

10. A method as in claim 3 wherein:
    (a) said hold time is on the order of 0.5-8 hours.

11. A method as in claim 2 wherein:
    (a) at least a portion of said water content is achieved by adding water to at least one of said clay, said composite and said additive-enhanced composite.

12. A method as in claim 11 wherein:
    (a) a substantial portion of the water required to be added to achieve said water content is added to said clay to form a clay slurry, and said slurry is added to said composite.

13. A method as in claim 2 wherein:
(a) said $Na_2SO_x$ is introduced in said fly ash by injection of a dry sodium sorbent into the flue gas duct of an industrial or utility boiler.

14. A method as in claim 13 wherein:
(a) said dry sodium sorbent is selected from Nahcolite, sodium bicarbonate, soda ash, trona, sodium sesquicarbonate, Wegscheiderite, or mixtures thereof.

15. A method as in claim 14 wherein:
(a) said sodium sorbent is solution-mined Nahcolite.

16. A method as in claim 1 wherein:
(a) up to about 3% of said water is replaced by a flocculant in an amount of up to 1 dry weight percent of said mix.

17. A method as in claim 2 wherein:
(a) up to about 3% of said water is replaced by a flocculant in an amount of up to 1 dry weight percent of said mix.

18. A method as in claim 1 wherein:
(a) said smectite clay is present in an amount of up to about 3 weight %.

* * * * *